(12) United States Patent
Fortes et al.

(10) Patent No.: US 7,613,648 B2
(45) Date of Patent: Nov. 3, 2009

(54) METHOD AND APPARATUS FOR ENHANCING THE BUSINESS AND ENGINEERING COMMUNICATION BETWEEN A SUPPLIER AND A BUYER

(75) Inventors: Pedro Luiz Discacciati Fortes, Sao Paulo (BR); Nelson Alves Thomaz, Sao Paulo (BR); Clovis Bergamo Filho, Sao Paulo (BR)

(73) Assignee: Xerox Corporation, Norwalk, CT (US)

( * ) Notice: Subject to any disclaimer, the term of this patent is extended or adjusted under 35 U.S.C. 154(b) by 1265 days.

(21) Appl. No.: 09/929,376

(22) Filed: Aug. 14, 2001

(65) Prior Publication Data

US 2003/0036991 A1    Feb. 20, 2003

(51) Int. Cl.
*Q06Q 40/00* (2006.01)
(52) U.S. Cl. ............................. 705/37; 705/38; 705/36; 705/35
(58) Field of Classification Search ................. 705/26, 705/27, 35–38, 34
See application file for complete search history.

(56) References Cited

U.S. PATENT DOCUMENTS

| | | | |
|---|---|---|---|
| 5,508,731 A | * | 4/1996 | Kohorn ...................... 725/24 |
| 5,765,138 A | * | 6/1998 | Aycock et al. ................. 705/7 |
| 5,842,178 A | * | 11/1998 | Giovannoli ................... 705/26 |
| 6,026,388 A | * | 2/2000 | Liddy et al. .................... 707/1 |
| 6,901,376 B1 | * | 5/2005 | Sculler et al. ................. 705/26 |

OTHER PUBLICATIONS

FreeMarkets Appoints Key Technology Executives; Veterans from Cisco, IBM and General Electric Lead Company's Product Research, Development and Management Efforts Business & High-Tech Editors. Business Wire. New York: Jul. 9, 2001. p. 1.*

* cited by examiner

*Primary Examiner*—Frantzy Poinvil
*Assistant Examiner*—Clement. Graham
(74) *Attorney, Agent, or Firm*—Fay Sharpe LLP

(57) ABSTRACT

Data is exchanged between a buyer and a plurality of suppliers via an internet supplier on-line system. A buyer requests a quotation from at least some of the suppliers for the cost of a part or device. When the request includes attachments, documents are generated wherein the request and attachments include both engineering and business documents. A determination is made whether the request is for a commodity part or device or for a non-commodity part or device. Once the supplier has downloaded this information, and the e-mail is generated to alert the buyer that such actions have occurred following an analysis of the request, the supplier is able to enter a quotation or bid.

15 Claims, 11 Drawing Sheets

METHOD AND APPARATUS FOR ENHANCING THE BUSINESS AND ENGINEERING COMMUNICATION BETWEEN A SUPPLIER AND A BUYER

BACKGROUND OF THE INVENTION

The present application is directed to communication networks used to enhance the communication process between a buyer and suppliers. More particularly, it is a systems integration solution providing a complete set of tools allowing companies to directly communicate documents via an internet connection which expedites the generation of Requests For Quotes (RFQ) and replies to the RFQ's in order to optimize the bidding and supply process Commonly, existing on-line business systems which intend to improve business flow between a buyer and a supplier only address partial business needs. In particular, existing communication solutions focus on a particular aspect of the business relationship such as the engineering communication or business communication. However, this piecemeal approach to improving business transactions result in systems which do not provide all information necessary for an efficient streamlining of the business process, and may also result in conflicting or overlapping systems being deployed within an organization. Such non-comprehensive solutions result in conflicts, miscommunication, or no communication between the business and engineering areas. Therefore, it has been determined to be beneficial to create an integrated internet based solution, which allows a buyer and its suppliers to exchange both engineering and business information in an organized, prompt, efficient, easy to use system.

It was also deemed desirable by the inventors to create such a system having an open architecture, where all computers within a business network may have access to information in a fast, efficient manner and to provide a secure transmission of information.

Such a system should allow for the viewing, printing, and downloading of engineering files and other documents over an intranet or extranet to enhance communication related to parts design for rapid prototyping and development. The system security may include a protected firewall intranet web server and an extranet web server. It would also be desirable to permit the system to issue requests for quoting/bidding including cost estimations, for specific commodities and non-commodity products and services. Further, the system should provide for a parts forecast/purchase order system, and a strategic materials management system based on manager/vendor inventory concepts.

SUMMARY OF THE INVENTION

In accordance with one aspect of the present invention, data is exchanged between a buyer and a plurality of suppliers via an internet supplier on-line system. The process includes, generating by a buyer a request for a quotation from at least some of the plurality of suppliers for the cost of a part or device. A determination is made if the request for the quotation will include attachments. When the request for quotation will include attachments, documents are generated wherein the request for quotation and attachments include both engineering and business documents. The determination is made as to which of a plurality of suppliers are to be provided with the request for quotation and attachments. An inquiry is then made as to whether all suppliers which are to be provided with a request for quotation and attachments are registered on the supplier on-line system. If a desired supplier is not presently on the system, the supplier is registered and a notification to the buyer is automatically made upon the registration. Next a determination is made whether the request for the quotation is for a commodity part or device or it is for a non-commodity part or device. Thereafter, the buyer selects which suppliers are to receive the request for quotation pack, and the request for quotation pack is made available to the selected suppliers on the on-line system web site. The selected suppliers are then e-mailed alerting them that the quotation package is available at the web site.

Upon reviewing the web site, the supplier is able to download the request for quotation pack including the engineering and business information. Once the supplier has downloaded this information, and the e-mail is automatically generated to alert the buyer that such actions have occurred following an analysis of the request for quotation pack, the supplier is able to enter a quotation or bid by uploading information including additional documentation to the buyer via the web site.

BRIEF DESCRIPTION OF THE DRAWINGS

The invention may take form in various components and arrangements of components, and in various actions and arrangements of actions. The drawings are only for purposes of illustrating a preferred embodiment and are not to be construed as limiting the invention.

DETAILED DESCRIPTION OF THE PREFERRED EMBODIMENTS

Figure 1:
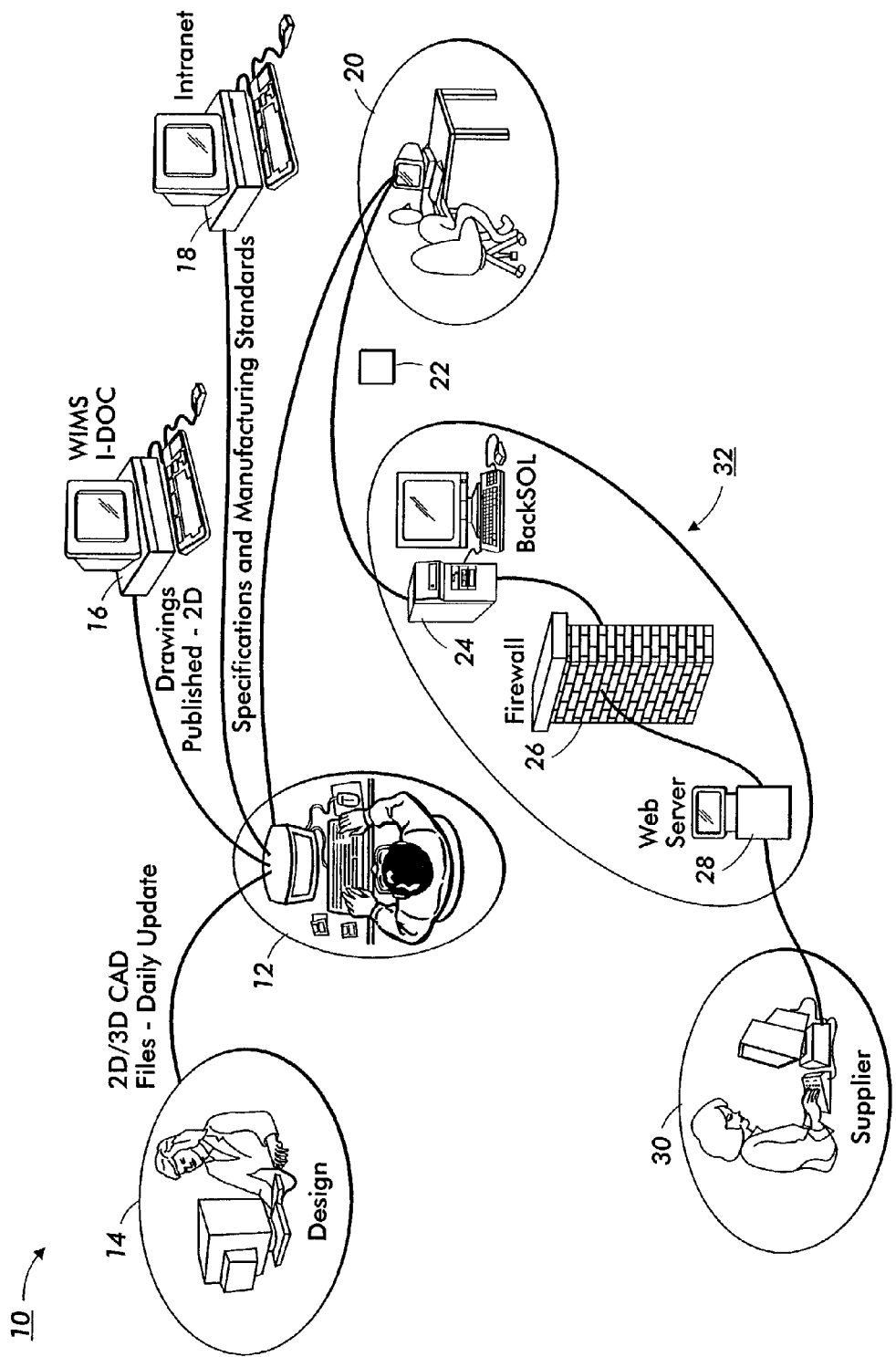
FIG. 1 depicts a topology for the supplier online (SOL) system according to the present invention.

Turning to FIG. 1, illustrated is a topology/architecture for a integrated web based software tool set, described here as a supplier online (SOL) system 10, designed for exchanging and managing supply chain information. FIG. 1 illustrates that a centralized SOL information area 12 receives data from a variety of sources within an organization, providing a centralized area for the accumulation of engineering data. The engineering data may be received from ongoing design generation, from design teams 14, within the organization of the buyer. These design teams commonly generate engineering drawings such as 2D and 3D CAD drawings which are updated to SOL information area 12. Other engineering information may be received from stored engineering documents from archival databases 16. This archived data may be stored on a variety of systems and/or databases, including but not limited to a Virtual Print Room (XVP) system, which is a digital data base and printing system for engineering drawings, maps, and diagrams. An XVP system may include an engineering scanner, plotters and printers integrated for document generation. Virtual Print Room (XVP) is a product of Xerox Corporation. Virtual Print Room, XVP and Internet Docs are trademarks of Xerox Corporation.

Engineering information used by SOL information area 12, may also be obtained from an Internet Docs system, which is a scalable engineering document access solution of Xerox Corporation. Internet Docs 2.0, for example, permits a user to set the storage capacity of engineering documents and implements MS SQL technology to provide improved performance, and allows users easy access for viewing and printing of engineering documents within a network.

Additional engineering information is provided to SOL information area 12 from an intranet connection 18 which contains specifications and manufacturing standards applicable to the buyer's organization. The engineering information which exists at SOL information area 12 is accessible and shared with a Business Communication Center (BCC) 20.

BCC 20, which communicates with SOL information area 12, generates and issues Requests For Quotations (RFQ) along with additional business related information such as impact analysis reports, quality reports, NPPO (Non Production Purchasing Operation) contracts, forecast delivery requirements, and other business related subject matter a supplier may need to respond to an RFQ. The engineering information for the RFQ and the business information will be combined into an RFQ Pack 22 having both business and engineering/technical information. RFQ Pack 22 is transmitted from BCC 20 to a back end SOL server 24 with appropriate synchronization and protocols allowing it to be transferred through SOL firewall 26 to a front end web server 28. A supplier 30, registered to the SOL system 10, and having an appropriate password accesses and downloads the RFQ Pack 22. The supplier may be connected to the SOL system 10 within an intranet/extranet connection or directly via the internet. Once the supplier has reviewed RFQ Pack 22, including the accompanying business and engineering data, the supplier electronically responds to the RFQ by submission of a bid or quotation.

The overall structure and operation of SOL system 10, permits cost reduction and process optimization in product, assembly, and parts development through the use of engineering drawing technologies as well as combining this data with business information and requirements. The SOL system 10 also provides conditions to deploy a structured process for responding to RFQs. While a single supplier is shown in FIG. 1, it is to be understood that RFQ Pack 22 may be issued to multiple suppliers who then have an opportunity to enter the bidding process. Implementation of the SOL system, only requires a connection by the suppliers to the internet. While CAD/CAM systems may be used, they are not required. In this embodiment, as long as the supplier is capable of reading IGES, , DXF and STEP files their inclusion in SOL system 10 is possible. It is noted the configuration including back end SOL server 24, firewall 26, and web server 28, form the physical infrastructure 32 of the SOL system.

Figure 2:
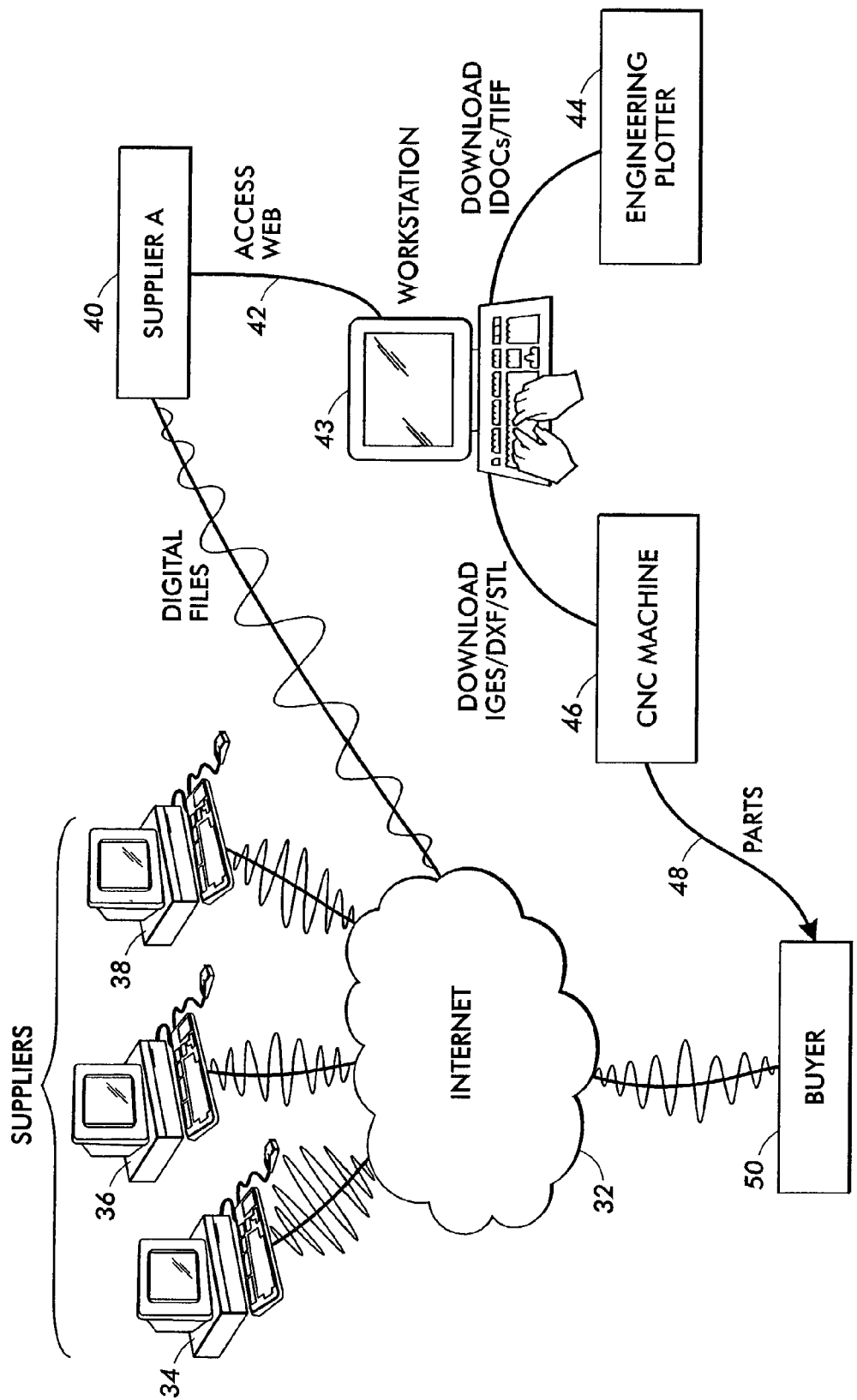
FIG. 2 depicts actions in a process focusing on the supplier upon receiving a Request for Quotation (RFQ) pack in or from the SOL system such as found on an SOL portal web site.

Turning to FIG. 2, illustrated is an overview of the SOL system, focussing on actions related to the supplier. Particularly, as previously mentioned, a plurality of suppliers 34-40 may receive RFQ Packs. What is emphasized in this drawing is that when, for example, a supplier such as supplier A 40, having access to the internet via an internet connection 42, will download the RFQ Pack to a work station 43 or other computing device. Supplier A 40 is then able to immediately download engineering information contained in the RFQ Pack to engineering workstations (CAD), plotters 44, CNC machines 46, or other devices. After reviewing this engineering information and following a review of the attached business information, the supplier will then submit its bid or reply to the RFQ. When the supplier wins the contract, for example to produce a part, the supplier may use the information from the RFQ Pack to begin immediate generation of parts 48 to be manufactured and supplied to the buyer 50.

Electronic transmission of engineering data, such as drawings, to the supplier on such an immediate basis decreases the lead-time necessary for generation of the actual physical parts to be delivered to the buyer 50. As previously noted, the electronic data received from the buyer in the form of engineering drawings etc. may be downloaded using background programs such as the Virtual Print Room (XVP), Intranet Docs 2.0, both from Xerox, or other document management systems.

Figure 3:
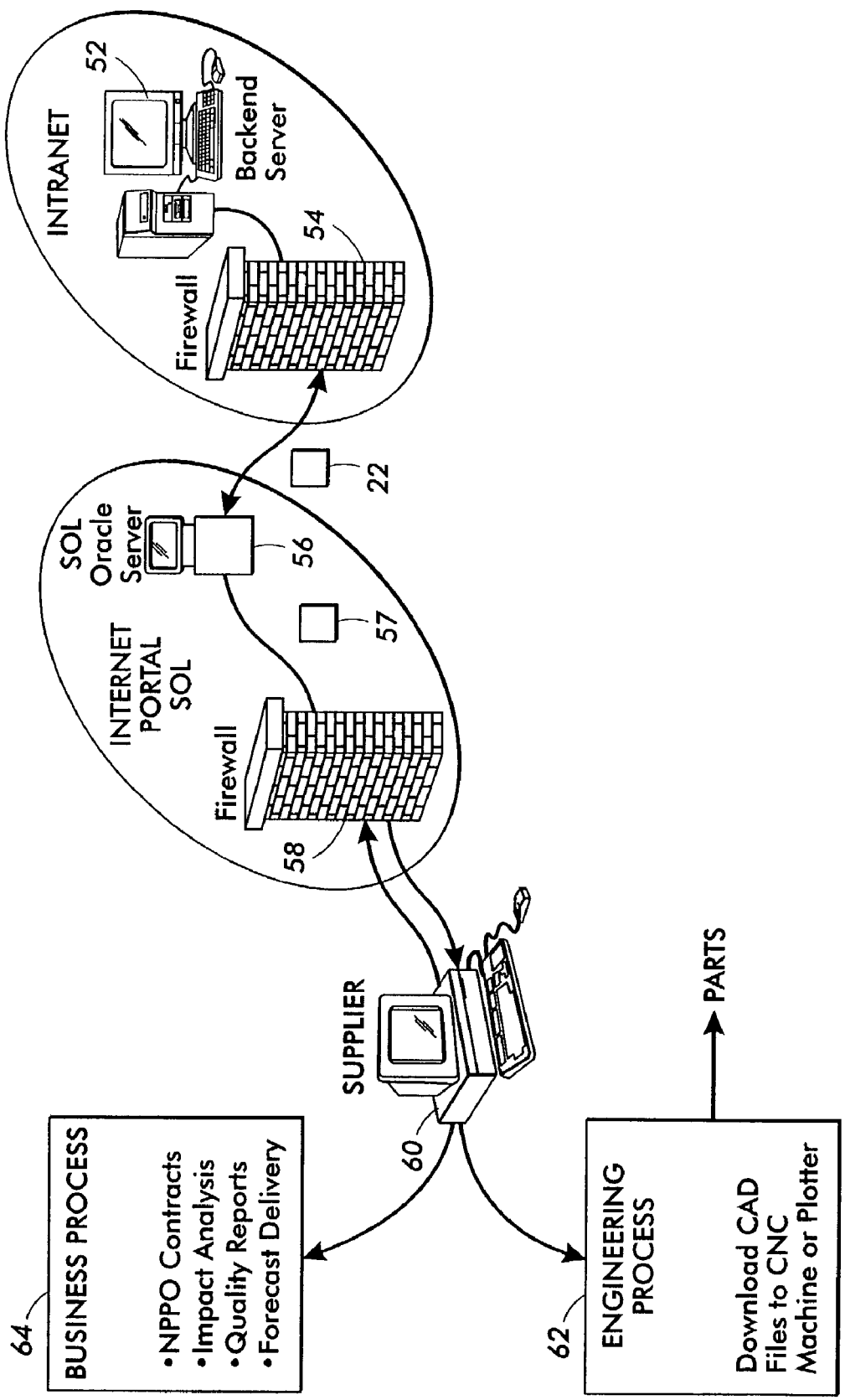
FIG. 3 illustrates the SOL arrangement of the present embodiment and the combination of business and engineering process data provided to a supplier.

Turning to FIG. 3, depicted is a more detailed view of certain aspects of the SOL system 10. Emphasized in this figure is that the SOL system 10 provides the suppliers with both the engineering and business information necessary to reply to the issued RFQ and to assist in the manufacture of parts or devices which are to be delivered to the buyer.

Further, the buyer's environment is shown to include back end server 52, and an intranet firewall 54. From this environment, RFQ Pack 22 is issued to an SOL server 56 which provides a web site portal 57 to the SOL system. SOL server 56 makes an RFQ available to suppliers who are provided access to the RFQ Pack 22 through internet firewall 58. The supplier 60 may communicate to the buyer through web site portal 57 to submit its reply to the issued RFQ Pack. The firewall architecture described in FIG. 3, permits the viewing, printing, and downloading of engineering documents 62, business documents 64 and other documents over the internet to intranet or extranet systems for approved registered suppliers. Thus, the security feature of the present embodiment includes both a protected intranet server 52 (i.e. back end SOL server 52) and a protected internet server SOL server 56.

Turning to FIGS. 4A-4E, shown is a flow diagram representing one embodiment for an RFQ process as accomplished in the SOL system of the present invention. It is noted that actions occurring in the flowchart are placed within columns designated Buyer, Administration, BackSol/FrontSol Intranet Server, Supplier On Line Internet Server, and Supplier External Process. Actions within the flowchart are located under the appropriate heading during the process flow.

A start quotation process action 70 is undertaken by a buyer to generate an RFQ and a bidding process between multiple suppliers when it is determined by a buyer that a component, part, device or other item is needed by the buyer. A first inquiry made is whether a file attachment will be necessary for the RFQ 72. When the answer is no, the process moves to action 74 where the buyer begins the process of generating and distributing the RFQ. On the other hand, when in action 72 when it is determined a file will be attached to the RFQ, then the process flow moves to action 76. In action 76, the buyer inputs the files which are to be attached to the RFQ. Particularly, files from the Xerox Virtual Print Room system, the Internet Docs system or other document storage system having engineering drawings etc. are downloaded by the buyer to a computer in the Business Communication Center (BCC) 20. The engineering information may, for example, be obtained from or through the SOL information area 12 of FIG. 1. Additionally, business information such as production forecast contracts, impact analysis studies, quality reports, etc. which are to be included, are also obtained and stored on the buyer's computer in the BCC. It is to be noted that action 76 may be accomplished prior to a buyer logging into the software portion of the SOL system 10. This is true in this embodiment as the buyer may already have access to the databases containing the needed information. However, in other embodiments, SOL 10 can require the buyer to log on to the SOL system in order to obtain access to the documents. Returning to FIG. 4A, at this point, the process moves to action 78 (it is to be noted that action 74 also moves action 78). The buyer is now directed to log into the software portion of the SOL system in order to generate an RFQ Pack and make the RFQ Pack available to suppliers.

Once the login process has been completed 78, which may be accomplished by a number of known login techniques, the system moves to action 80 where an inquiry block questions whether all suppliers to be involved in the RFQ Pack bidding process are registered on the SOL system. If the answer to this inquiry is no, then a supplier is invited to register into the SOL system. This may occur via an e-mail message from the buyer, or simply a telephone conversation between the buyer and supplier. In this embodiment of action 80, the buyer may determine that a particular supplier has not been registered in one of many ways. For example, the SOL system may include a supplier page listing all suppliers that are currently registered on the system. When a supplier does register, the process moves to action 84 where the SOL system issues an e-mail to the buyer informing the buyer that the supplier has registered.

Figure 4A:
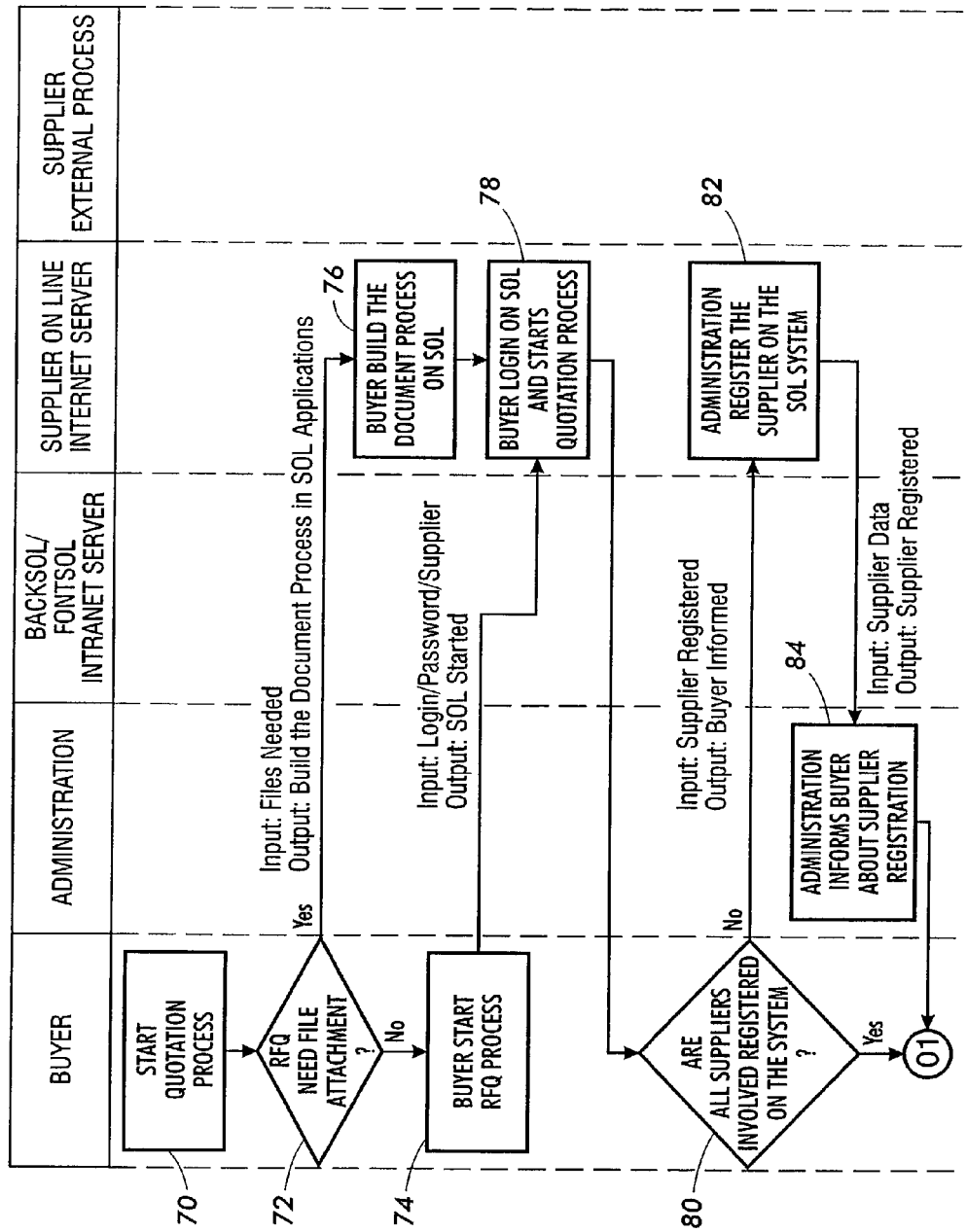
FIGS. 4A-4E set forth a flowchart for an RFQ process.
Figure 4B:
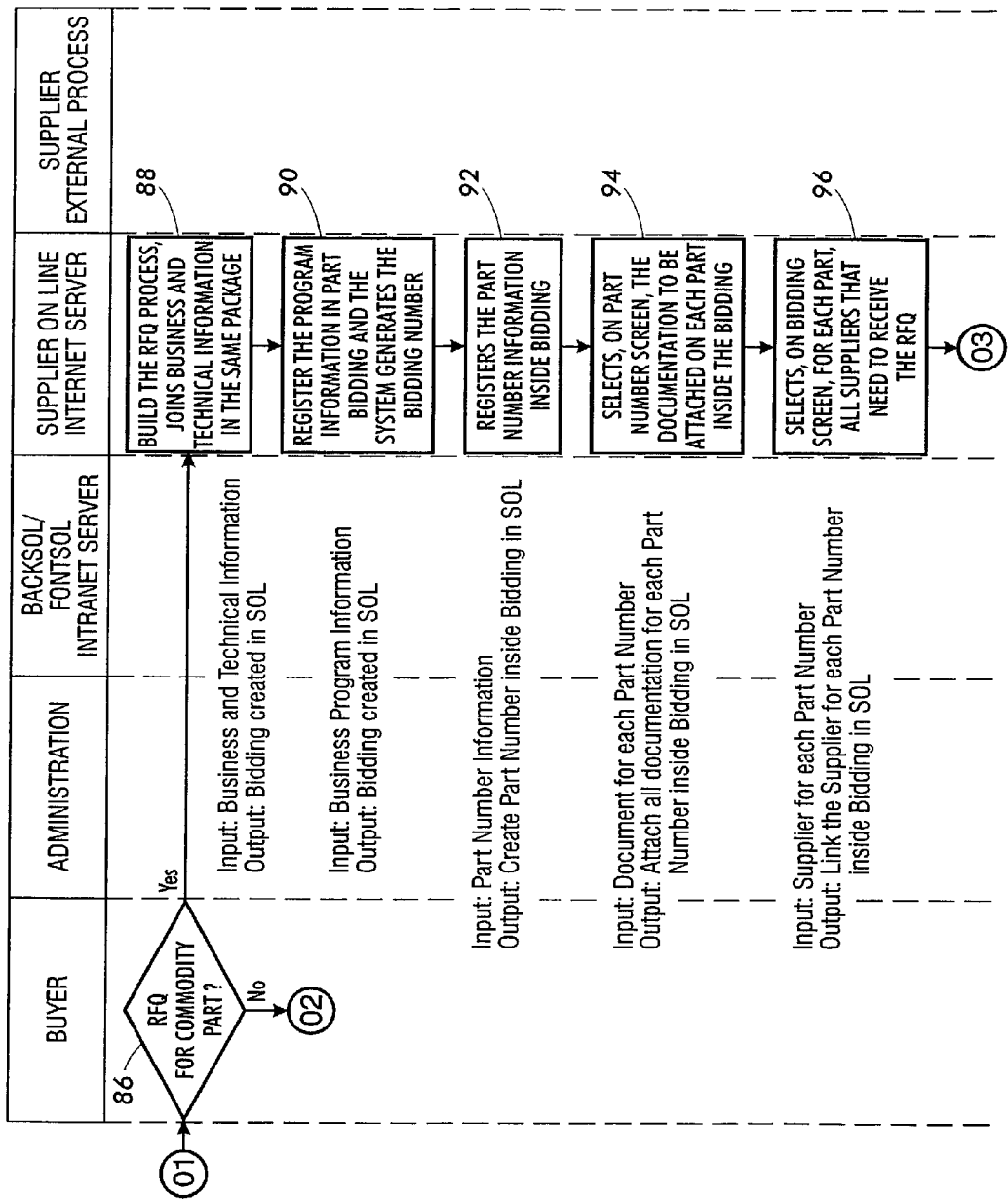

If in action 80, all suppliers are noted to have been registered, the process moves to action 86 of FIG. 4B. The next inquiry made at action 86 is whether the RFQ will be for a commodity part or device. In other words, the system determines whether this is a commodity part or device such as found in an existing catalog, or it is a non-commodity part or device. When it is determined that the RFQ will be for a commodity part, the system moves to action 88 where the buyer builds the RFQ process by combining the business and technical information previously obtained into a single a package or pack. Again, this information is drawn from both the engineering and business databases available to the buyer within its organization.

The actions of generating the RFQ Pack include generating an electronic document which may have both engineering and business information. The document may be a standardized form implemented by the buyer's organization. Attachments may be accomplished in one of a variety of manners, including the implementation of hypertext links, wherein reference to engineering drawings within a written text lead a user to engineering or business documents. Alternatively, engineering drawing files may be attached to the end of the electronic document and the supplier will download and open these files in any known manner.

Once the RFQ Pack has been generated, the process moves to action 90 where the buyer registers the RFQ Pack program information to be sent out for bidding. At this point the SOL system will generate a bidding number. Within this bidding operation created by the SOL system, the buyer, in action 92, registers the particular part number or device number information for that bidding process. Once the part/device number information has been included within the bidding operation, the process moves to action 94 where the user will be prompted to select on a part/device number screen, a specific documentation to be attached or associated with a particular part/device number of the generated bid. Therefore, the business information that had been accumulated in action 88 may be more specifically associated with the particular parts/devices designated by parts/device numbers being put up in the bid process under the registered bidding number. The process then moves to action 96, where the user is prompted to select, on a bidding screen, for each part/device, all the suppliers that are to receive the RFQ Pack. It is to be appreciated, that the part/device bidding screen may be viewed by the buyer on their computer or workstation in the BCC 20 of FIG. 1. Also, while FIG. 1 shows a single BCC section, of course multiple buyers may be attached to the present SOL system.

Figure 4C:
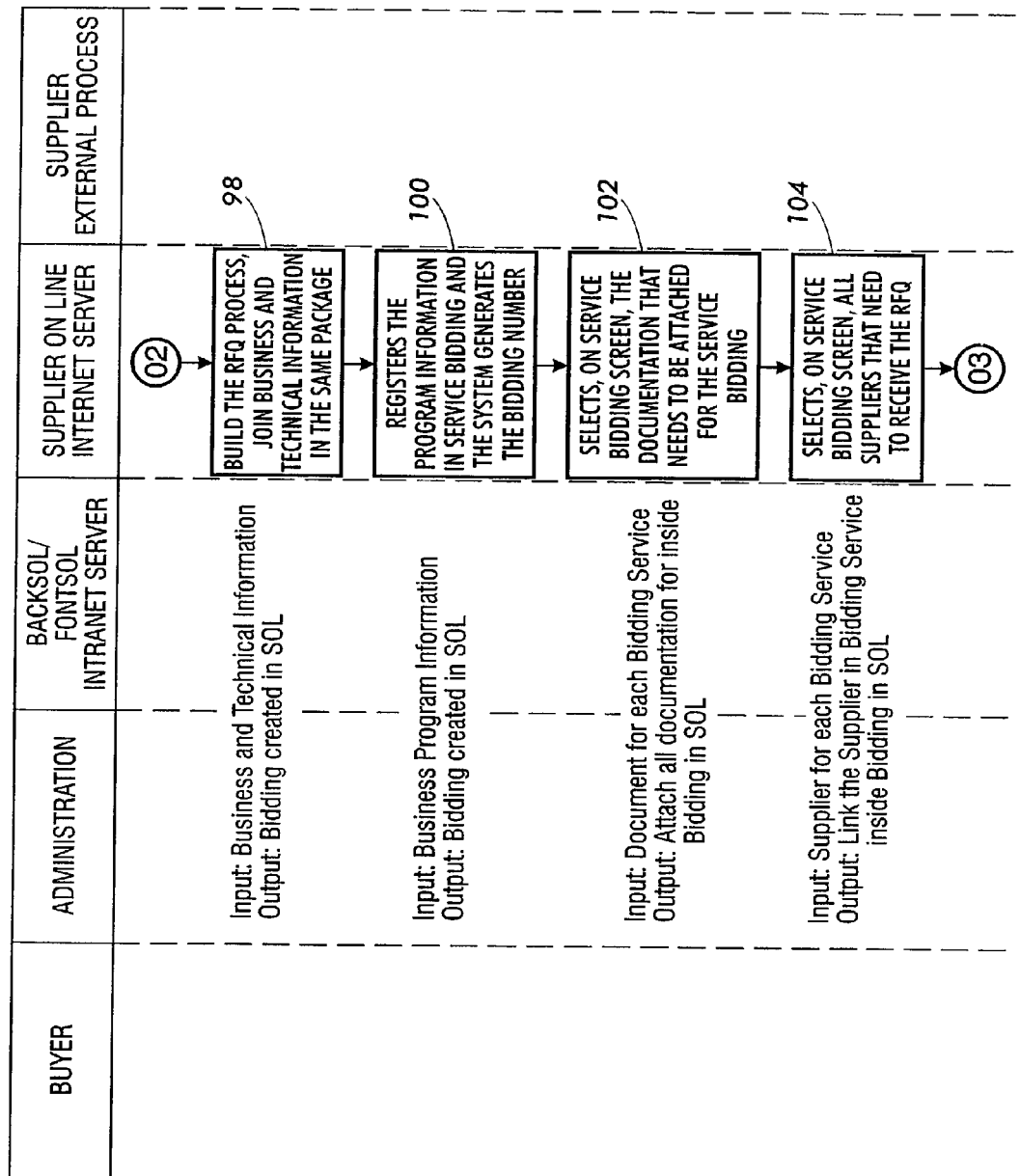

Returning to action 86, if the buyer determines that the RFQ to be generated is not for a commodity part or device, the process moves to action 98 of FIG. 4C. In this action, similar to action 88, the buyer will build the RFQ process by bringing together business and technical information into a single package. Once this information from the various sources have been obtained, the process moves to action 100 where the buyer registers the program information in a service bidding process and the system generates a bidding number for that service bid. Once the bidding number has been obtained, the process moves to action 102 where the buyer selects, on a service bidding screen, the documentation that will be attached for each specific service bid. Thereafter the process moves to action 104 where the buyer selects on the service bidding screen, all suppliers that need to receive that particular RFQ. It is to be understood that the service bidding screen may also be a screen shown on the computer or workstation in BCC 20 of FIG. 1.

Figure 4D:
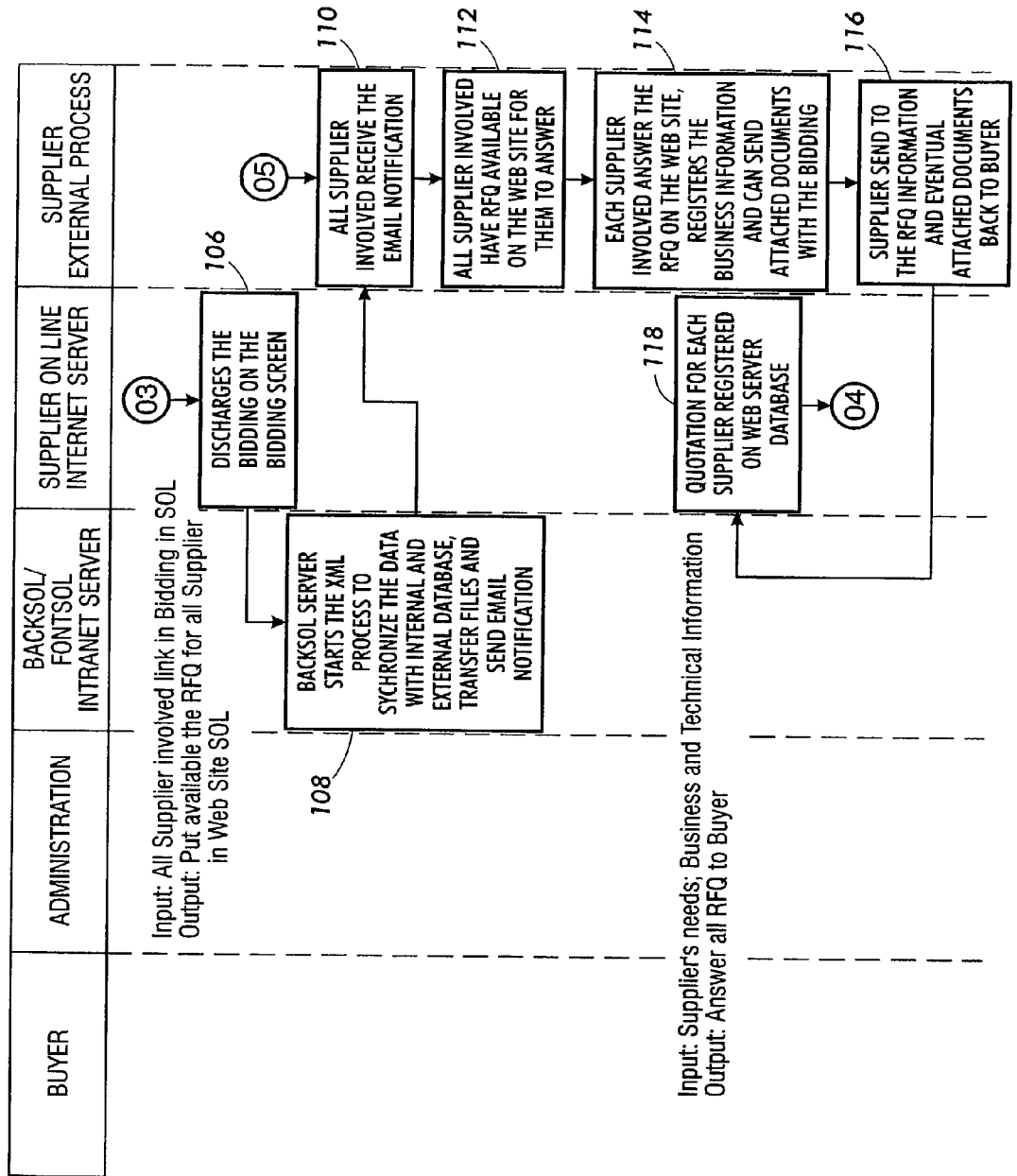

Turning to FIG. 4D, once the process has generated an RFQ Pack for either a commodity part/device or a non-commodity part/device, the system moves to action 106 where the buyer discharges the bidding on the bidding screen. Particularly, the buyer requests that the generated RFQ Pack be forwarded to all selected registered suppliers.

At this point, the process moves to action 108 where the back end SOL server begins a synchronization operation so that data of the RFQ Pack is synchronized with data of internal and external data bases from which documentation within the RFQ Pack needs to be transferred. Such a synchronization may be executed, in one embodiment, by the use of an XML (Extendable Markup Language) process which is known in the art. Once synchronization has been achieved the files are transferred. Additionally, in action 108 the SOL system generates and sends an e-mail notification to the suppliers informing them of the existence of an RFQ Pack which now may be obtained Following the operations in action 108, the process moves to action 110. Particularly, the suppliers involved in the bidding process will receive the previously mentioned e-mail notifications. These notifications will inform the suppliers, as shown in action 112, that they have an RFQ available on the SOL web site portal, which they may then review. In action 114 each supplier which has been supplied access to the RFQ Pack is able to download the engineering and business information which has been integrated in the RFQ Pack. In responding to the RFQ Pack, the suppliers will upload, as part of their response, their own documentation and/or business information to the buyer (action 116). By this operation a quotation is obtained by the buyer from the registered suppliers via the SOL system, action 118.

Figure 4E:
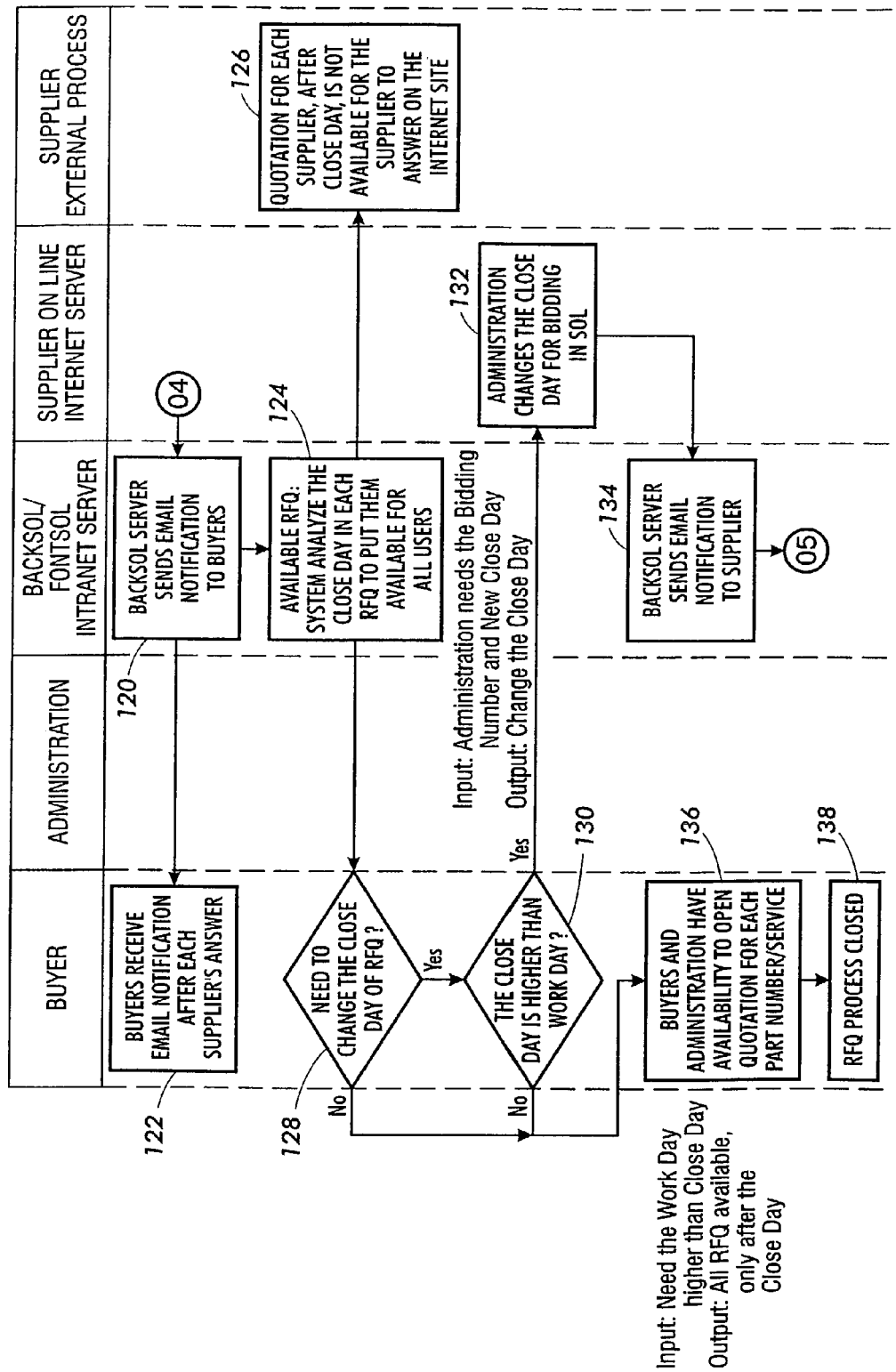

Following action 118, and as shown in FIG. 4E, in action 120 once the supplier has generated a quotation response to the RFQ Pack, the back end SOL server generates an e-mail notification to the buyers. This notification will be received via an e-mail after a supplier has generated and submitted its quotation, action 122. Additionally, the SOL system will analyze the "Close Day" for each RFQ to which a supplier is responding. This operation begins at action 124. A Close Day, as noted at action 126, is the day after which a supplier is no longer permitted to submit a quotation.

From action 124, the process moves to inquiry action 128, where the system will question whether there is a need to change the Close Day of the RFQ Pack. If the response to this inquiry is in the positive, the process moves to action 130, where an inquiry is made as to whether the Close Day is higher than the "Work Day." Particularly, action 130 inquires whether the Close Day (e.g. May 10) is before (e.g. May 5) or after (e.g. May 30) the Work Day; where the Work Day is the last day the buyer has determined is acceptable for receiving quotes in order to receive the part or device of the RFQ Pack by a desired date. If the Close Day is before the Work Day, the process moves to action 132 where the buyer is provided with an opportunity to alter the date of the Close Day. If the buyer alters the Close Day, the process moves to action 134 where the back end server generates e-mail notifications to all suppliers of this date change. At this point, the process re-traces actions 110-118 of FIG. 4D.

Alternatively, if in action 130, the Close Day is the same as the Work Day, the process moves to action 136 wherein it is determined that no additional quotations from suppliers are to be received and therefore the buyer may review the quotations from each supplier who has answered the RFQ Pack. At this point, the process moves to action 138 where the RFQ process is completed. The supplier may after this time make a selection to accept one of the supplied bids, or redo the RFQ process.

Figure 5:
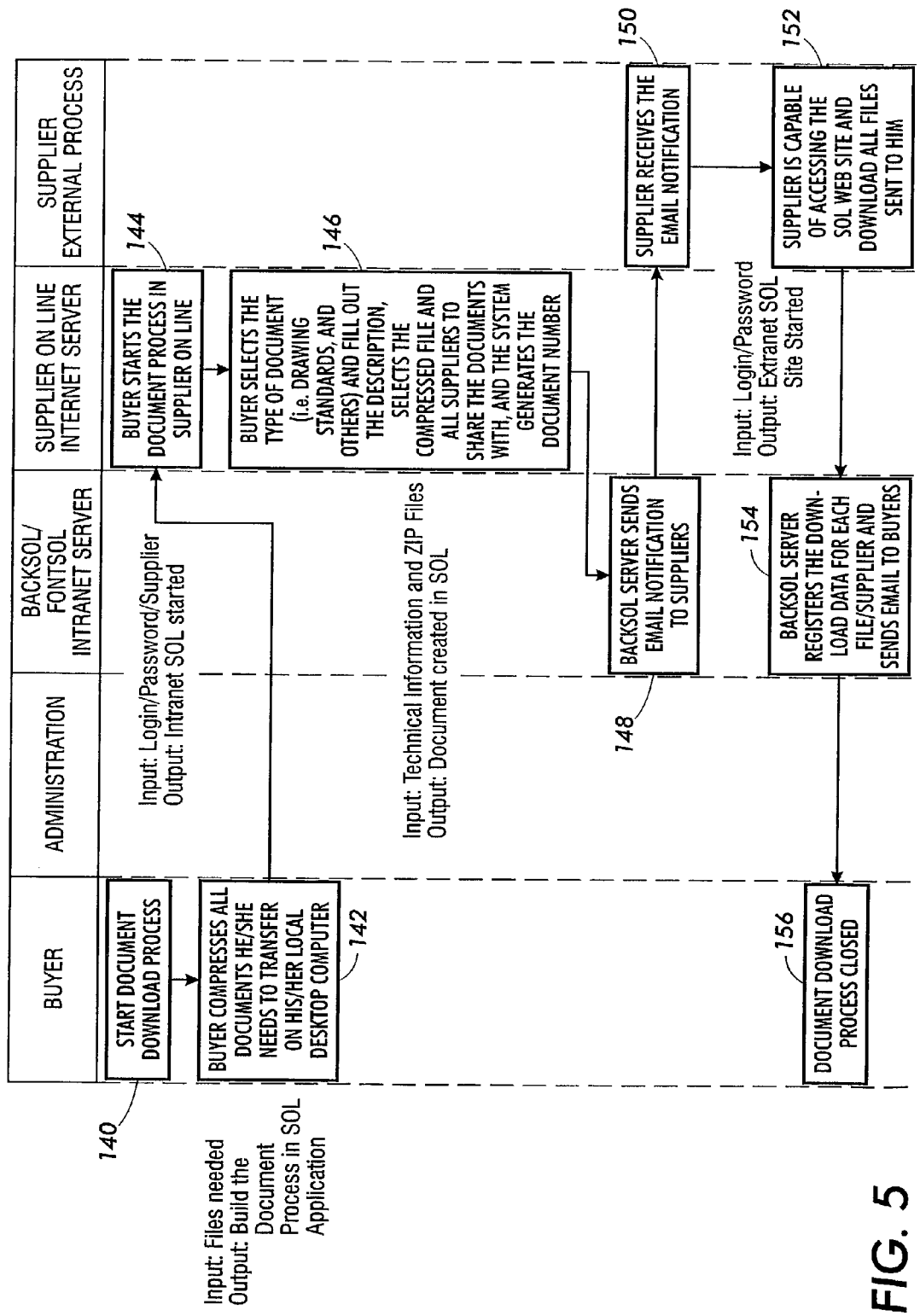
FIG. 5 is a document download process used in the supplier online system of the present invention.

Turning to FIG. 5, depicted is a flowchart describing the process to send a documentation direct to supplier. Initially, in action 140, a buyer initiates the document download process. In action 142, the buyer obtains and then compresses documents that are to be part of the RFQ Pack, such that the compressed documents are located on the buyer's computer.

Following compression of the documents, the process moves to action 144 where the buyer starts the process for generating the RFQ Pack in the Supplier On-Line (SOL) system. More particularly, as described in action 146, the buyer selects the type of document (e.g. drawings, standards, specifications and others). The buyer then fills out a description of the documents and selects the previously compressed files. These files will eventually be provided to all suppliers to share when responding to the RFQ Pack. The SOL system then generates a document number for each of the described and compressed files which are to be included in the RFQ Pack.

Once the actions of action 146 have been completed, the back end SOL server will generate an e-mail notification for the selected suppliers, action 148. The e-mail is received by the selected suppliers 150, and thereafter the supplier is permitted to access and download those files which have been sent 152. The back end SOL server, action 154, will register the download date for each file downloaded by a supplier, and will send an e-mail to the buyer indicating that the information has been downloaded by the supplier, whereafter the process closes, action 156.

The flowchart of FIG. 5 therefore depicts a more detailed view of the process by which documents, including engineering and/or business documents included within an RFQ Pack are generated and then downloaded for display to a supplier.

Figure 6:
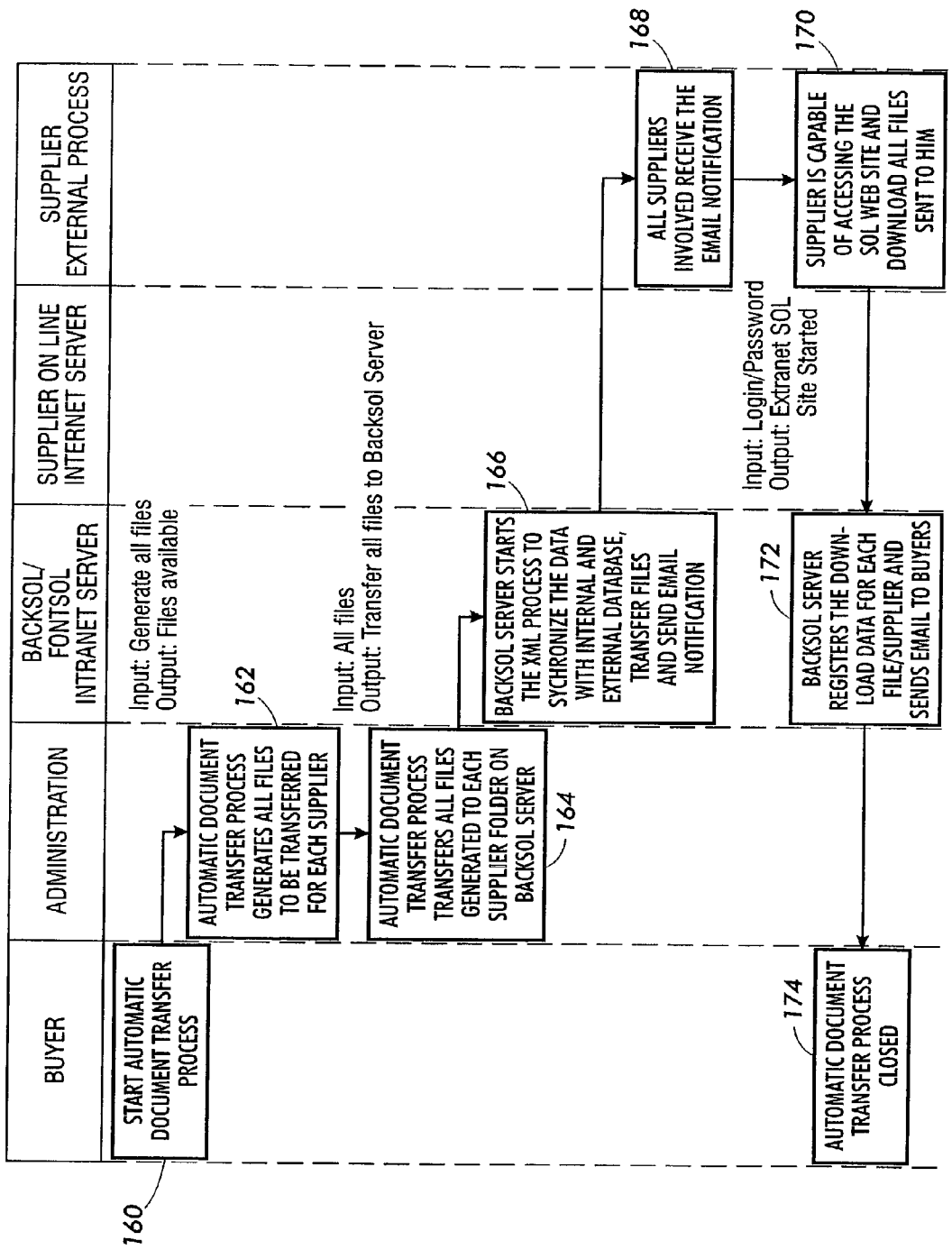
FIG. 6 depicts the flow process for an automatic document transfer process according to the present invention.

Turning to FIG. 6, shown is a flowchart setting forth actions in an automatic document transfer process of the present invention. In action 160, a buyer initiates automatic document transfer process, wherein files which are to be transferred to each supplier are generated, action 162. This generation may occur by pulling the files from other databases where they have been archived. In a action 164, the automatic transfer process then transfers all files which are generated to a supplier folder located on the back end SOL server. Each registered supplier may have a separate file into which the generated documents or files are placed.

Once this transfer of files has been accomplished, the process moves to action 166 wherein the back end server begins a synchronization process such as an XML process, whereby synchronization of the data with internal and external databases is undertaken to permit the transfer of the files. This action also generates an e-mail notification to the suppliers where the suppliers receive the notification in action 168. The notification indicates that the files are available. Thereafter, and as shown in action 170, the supplier is provided with the capability of accessing the SOL web site to download the files which have been forwarded. When the supplier downloads a file, the back end SOL server registers the download date and generates an e-mail for the buyer to indicate that the files have been downloaded, action 172. Thereafter, once the files have been downloaded and the buyers have been informed, the automatic document transfer process is ended, action 174.

Figure 7:
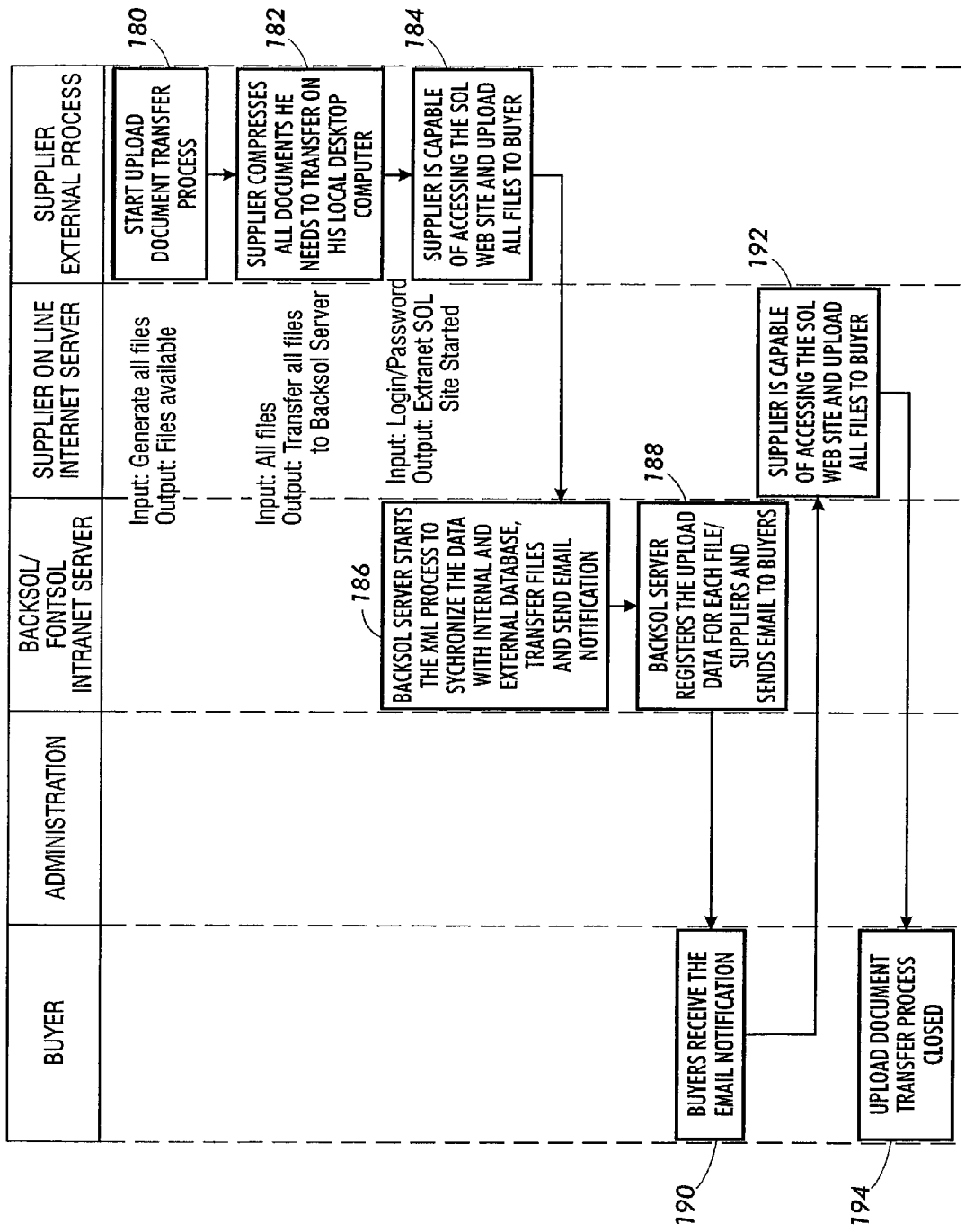
FIG. 7 details a document upload transfer process according to the present invention.

Turning to FIG. 7, provided is a flowchart which details a process for uploading document transfers. Particularly, this is a situation where the supplier accesses the SOL web site portal in order to upload information to the buyer. In action 180, the supplier begins the upload document transfer process whereby the supplier in action 182 compresses all the documents to be transferred to the buyer.

Once the selected documents have been compressed, the process moves to action 184 where the supplier accesses the SOL web site to upload the files to the supplier's organization. Particularly, the supplier will login, such as by entering a password, identifying the supplier as someone permitted to access the SOL web site. Once logged in, the supplier will instruct the SOL system 10 to upload the selected documents. This instruction causes the back end SOL server to begin a synchronization process (action 186) which may use for example an XML process, in order to synchronize the data with internal and external databases in order to transfer the files of the selected documents. Action 186 will result in the back end SOL server also generating an e-mail notification to the buyer that files are being uploaded. As the process moves to action 188, the back end SOL server registers the date each file from the supplier has been uploaded and sends an e-mail to a buyer. Next, the buyer is informed by the e-mail 190 of the upload. At the time of uploading, the supplier maintains the capability, action 192, of accessing the SOL system and downloading files from the buyer. Following this action, the upload document transfer process is closed, action 194.

The following description provides a complete set of tools which permit organizations to directly communicate documents over an intranet/extranet, which uses a SOL portal web site. It further generates an internal workflow using e-mails which are automatically generated by the system to accelerate the process and to insure responsiveness between the parties.

The described SOL system therefore is a document management system/model based on an open infrastructure where all users of a network are able to access the information in a quick manner and to securely provide people with the information that is required in a buying/supplying transaction. Access can be restricted by use of login and password techniques. The system also connects customers and suppliers through the extranet.

By use of the SOL system described above, the following business operations are provided and improved, including the viewing, printing and downloading of engineering and other documents over an intranet or extranet. System security is provided by implementation of a firewall protected intranet web server and a firewall protected extranet server. This system also permits for the requests for quoting/bidding to include cost estimation process according to each specific commodity, the downloading of CAD/CAM files to enhance parts communication content process which in turn allows for rapid prototyping for development. The system still further provides a parts/forecast purchase order and a strategic materials management based on "vendor management inventory" concepts.

In one embodiment, the system is developed using MS ASP language and MS Visual studio (both products of Microsoft Corporation), and is served by an IIS 4.0 server. The system will access, in this embodiment, an Oracle database (from Oracle Corporation, and which is a trademark of Oracle Corporation), to store and retrieve data related to the workflow process it implements.

The back end SOL server includes a continuous updating feature to check for new bidding as it occurs or new RFQ Packs which are being put out to bid.

It is to be appreciated that the foregoing components and organization are simply one embodiment in which the present invention may occur. The invention has been described with reference to this preferred embodiment. However, obviously, modifications and alternations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of exchanging data between a buyer and a plurality of multiple suppliers via an internet electronic supplier on-line system having a physical infrastructure including a back end supplier on-line server and an internet supplier on-line server, the method comprising:
   generating by a buyer a request for a quotation from at least some of the plurality of suppliers for a cost of a part or device;
   generating at least one attachment document, at least one of the request for quotation and the at least one attachment document including both engineering information and business information;
   determining which of the plurality of suppliers are to be provided with the request for quotation;
   inquiring if all suppliers to be provided with the request for quotation are registered on the electronic supplier on-line system;
   responsive to the inquiring, registering the suppliers not registered on the electronic supplier on-line system;
   notifying the buyer, automatically by the electronic supplier on-line system, of the registration of the suppliers;
   selecting which of the generated at least one attachment document are to be attached as part of a service bidding process corresponding to respective non-commodity parts or devices of the request for quotation;
   building the request for quotation, including joining the selected generated attachment documents into a request for quotation pack, the request for quotation pack including the business information and the engineering information, the engineering information to be used by at least one of the suppliers for generating the non-commodity parts or devices;
   registering information in the service bidding process for the non-commodity parts or devices;
   selecting the suppliers that are to receive the request for quotation pack;
   making the request for quotation pack available to selected suppliers on a supplier on-line system web site stored on the internet supplier on-line server, including:
   synchronizing the request for quotation with internal and external databases in order to transfer the files to a designated web site;
   e-mailing all suppliers that the request for quotation pack is available at the web site;
   downloading the request for quotation pack from the internet supplier on-line server to at least one of the suppliers; and
   displaying the request for quotation pack on a computing device for the at least one of the suppliers.

2. The method according to claim 1 further including:
   receiving from the supplier a quotation corresponding to the request for quotation pack; and
   e-mailing automatically by the electronic supplier on-line system, the buyer that the supplier has entered a quotation.

3. The method according to claim 2 further including an upload document transfer process wherein a supplier is able to upload document information to the electronic supplier on-line system which may be received by the buyer.

4. The method according to claim 1 further including:
   analyzing automatically the request for quotation pack to determine a last day available for the supplier to respond;
   determining, if the day the quotation is provided by the supplier is prior to the last day to respond to the request for quotation pack; and
   providing the buyer with the capability to review quotations for request for quotation pack received prior to the last day to respond.

5. The method according to claim 4 further including:
   determining whether a need exists to alter the last day for responding to a request for quotation;
   altering the last day suppliers may respond to a request for quotation; and
   transmitting, automatically, e-mail notifications to the suppliers that the last day to respond to the request for quotation has been altered.

6. The method according to claim 1 further including an action of downloading documentation from sources outside of the electronic supplier on-line system for inclusion into the request for quotation pack.

7. The method according to claim 1, further including an automatic document transfer process which generates files to be included in the request for quotation pack wherein the automatic document transfer process transfers the generated files to individual supplier folders maintained on the back end supplier on-line server.

8. The method according to claim 1 further including:
   registering part or device number information within the bidding process for the commodity parts or devices; and
   selecting the documentation that is to be attached to individual parts or devices of the request for quotation to form the request for quotation pack.

9. A method configured to exchange data between a buyer and a plurality of suppliers via an electronic on-line communication network having a physical infrastructure including a back end supplier on-line server and an internet supplier on-line server, the method comprising:
   generating a request for a quotation intended for at least some of the plurality of suppliers for a cost of a part or device;
   determining if the request for the quotation will include attachments;
   generating documents for inclusion as attachments to the request for quotation, the request for quotation and attachments including both engineering and business documents;
   determining that the request for quotation is for a commodity part or device or is for a non-commodity part or device, and (i) selecting which of the generated documents are to be attached as part of an item bidding process corresponding to each of the commodity parts or devices or (ii) selecting which of the generated documents are to be attached as part of a service bidding process corresponding to each of the non-commodity parts or devices, the commodity part or device being found in a catalog;

building the request for quotation, including joining the selected business and engineering documentation into a request for quotation pack;

registering information in one of the item bidding process for commodity parts or devices or the service bidding process for non-commodity parts or devices;

selecting the suppliers that are to receive the request for quotation pack;

making the request for quotation pack available to selected suppliers on an electronic on-line communication network web site;

synchronizing the request for quotation pack with data of internal and external databases;

receiving from at least one of the selected suppliers by the internet supplier on-line server, a supplier quotation comprising supplier documentation and supplier business information;

generating a buyer notification e-mail by the electronic on-line communication network in response to receiving the supplier quotation; and displaying the request for quotation pack on a computing device for at least one of the selected suppliers.

10. The method according to claim 9 further including:
configuring the request for quotation pack for automatic analysis by one of the suppliers to determine a last day available for the supplier to respond; and
providing the buyer with the capability to review quotations for request for quotation pack received prior to the last day to respond.

11. The method according to claim 9 wherein the action of making the request for quotation with the attached documents available to select suppliers includes synchronizing the data in the request for quotation with internal and external databases in order to transfer the files to a designated web site.

12. The method according to claim 9 further including an action of downloading documentation from sources outside of the electronic on-line communication network for inclusion into the request for quotation pack.

13. The method according to claim 9 further including:
registering part or device number information within the bidding process for the commodity parts or devices; and
selecting the documentation that is to be attached to individual parts or devices of the request for quotation to form the request for quotation pack.

14. The method according to claim 9 further including:
determining by the electronic on-line communication network a closed day for the request for quotation pack; and
prohibiting reception of the supplier quotation after the determined closed day.

15. A method configured to exchange data between a buyer and a plurality of suppliers via an electronic on-line communication network having a physical infrastructure including a back end supplier on-line server and an internet supplier on-line server, the method comprising:

generating a request for a quotation intended for at least some of the plurality of suppliers for a cost of a part or device;

determining if the request for the quotation will include attachments;

generating documents for inclusion as attachments to the request for quotation, the request for quotation and attachments including both engineering and business documents;

determining that the request for quotation is for a commodity part or device or is for a non-commodity part or device, and (i) selecting which of the generated documents are to be attached as part of an item bidding process corresponding to each of the commodity parts or devices or (ii) selecting which of the generated documents are to be attached as part of a service bidding process corresponding to each of the non-commodity parts or devices, the commodity part or device being found in a catalog;

building the request for quotation, including joining the selected business and engineering documentation into a request for quotation pack;

registering information in one of the item bidding process for commodity parts or devices or the service bidding process for non-commodity parts or devices;

selecting the suppliers that are to receive the request for quotation pack;

making the request for quotation pack available to selected suppliers on an electronic on-line communication network web site;

synchronizing the request for quotation pack with data of internal and external databases;

receiving from at least one of the selected suppliers by the internet supplier on-line server, a supplier quotation comprising supplier documentation and supplier business information;

generating a buyer notification e-mail by the electronic on-line communication network in response to receiving the supplier quotation;

displaying the request for quotation pack on a computing device for at least one of the selected suppliers; and downloading the engineering documents to at least one of a CAD workstation, a plotter, and a CNC machine, wherein the engineering documents control operation of the at least one of the CAD workstation, the plotter, and the CNC machine which generates at least one of a printed document or a manufactured part.

* * * * *